United States Patent
Bao et al.

(10) Patent No.: US 11,522,845 B2
(45) Date of Patent: Dec. 6, 2022

(54) METHODS AND SYSTEMS FOR AUTOMATICALLY AND SECURELY JOINING AN ASSOCIATION

(71) Applicant: EMC IP Holding Company LLC, Hopkinton, MA (US)

(72) Inventors: Qi Bao, Acton, MA (US); Himabindu Tummala, South Grafton, MA (US)

(73) Assignee: EMC IP Holding Company LLC, Hopkinton, MA (US)

( * ) Notice: Subject to any disclaimer, the term of this patent is extended or adjusted under 35 U.S.C. 154(b) by 489 days.

(21) Appl. No.: 16/699,548

(22) Filed: Nov. 29, 2019

(65) Prior Publication Data

US 2021/0168126 A1    Jun. 3, 2021

(51) Int. Cl.
*H04L 9/40* (2022.01)
*H04L 47/10* (2022.01)

(52) U.S. Cl.
CPC ............ *H04L 63/08* (2013.01); *H04L 63/101* (2013.01); *H04L 47/10* (2013.01)

(58) Field of Classification Search
CPC ..... H04L 63/08; H04L 63/101; H04L 63/104; H04L 47/283; H04L 45/46; H04L 47/10
USPC .............................................................. 726/6
See application file for complete search history.

(56) References Cited

U.S. PATENT DOCUMENTS

| | | | |
|---|---|---|---|
| 2004/0085908 A1* | 5/2004 | Balasubramanian ... | H04L 45/46 370/252 |
| 2013/0054966 A1* | 2/2013 | Clay .................... | H04L 63/0869 713/168 |
| 2018/0007059 A1* | 1/2018 | Innes .................... | H04L 9/3228 |

\* cited by examiner

*Primary Examiner* — Benjamin A Kaplan
(74) *Attorney, Agent, or Firm* — Chamberlain, Hrdlicka, White, Williams & Aughtry

(57) ABSTRACT

A method for joining an association that includes receiving, by a first cluster, an association access credential and a unique address of an association manager, generating, based on the association access credential, an association access request, sending, to the unique address, the association access request, receiving, in response to the sending, association information, and initiating, based on the association information, a connection to a second cluster in the association.

13 Claims, 14 Drawing Sheets

| Cluster | H | J | P | N |
|---|---|---|---|---|
| E | 16 | 92 | 27 | 39 |
| N | 57 | 26 | 44 | |
| P | 17 | 10 | | |
| J | 24 | | | |

| Paths from J to E | Individual Weights | Combined Weight |
|---|---|---|
| J-E | 92 | 92 |
| J-H-E | 24+16 | 40 |
| J-P-E | 10+27 | 37 |
| J-N-E | 26+39 | 65 |
| J-H-P-E | 24+78+27 | 129 |
| ... | ... | ... |
| J-H-P-N-E | 24+78+44+39 | 185 |

METHODS AND SYSTEMS FOR AUTOMATICALLY AND SECURELY JOINING AN ASSOCIATION

BACKGROUND

Devices and/or components of devices are often capable of performing certain functionalities that other devices and/or components are not configured to perform and/or are not capable of performing. In such scenarios, it may be desirable to adapt one or more systems to enhance the functionalities of devices and/or components that cannot perform the one or more functionalities.

SUMMARY

In general, in one aspect, the invention relates to a method for joining an association. The method includes receiving, by a first cluster, an association access credential and a unique address of an association manager, generating, based on the association access credential, an association access request, sending, to the unique address, the association access request, receiving, in response to the sending, association information, and initiating, based on the association information, a connection to a second cluster in the association.

In general, in one aspect, the invention relates to a non-transitory computer readable medium that includes instructions which, when executed by a computer processor, enables the computer processor to perform a method for joining an association. The method includes receiving, by a first cluster, an association access credential and a unique address of an association manager, generating, based on the association access credential, an association access request, sending, to the unique address, the association access request, receiving, in response to the sending, association information, and initiating, based on the association information, a connection to a second cluster in the association.

In general, in one aspect, the invention relates to a first cluster that includes memory, persistent storage, and a processor. The processor is configured to receive, by the first cluster, an association access credential and a unique address of an association manager, generate, based on the association access credential, an association access request, send, to the unique address, the association access request, receive, in response to the sending, association information, and initiate, based on the association information, a connection to a second cluster in the association.

Other aspects of the invention will be apparent from the following description and the appended claims.

DETAILED DESCRIPTION

Figure 1:
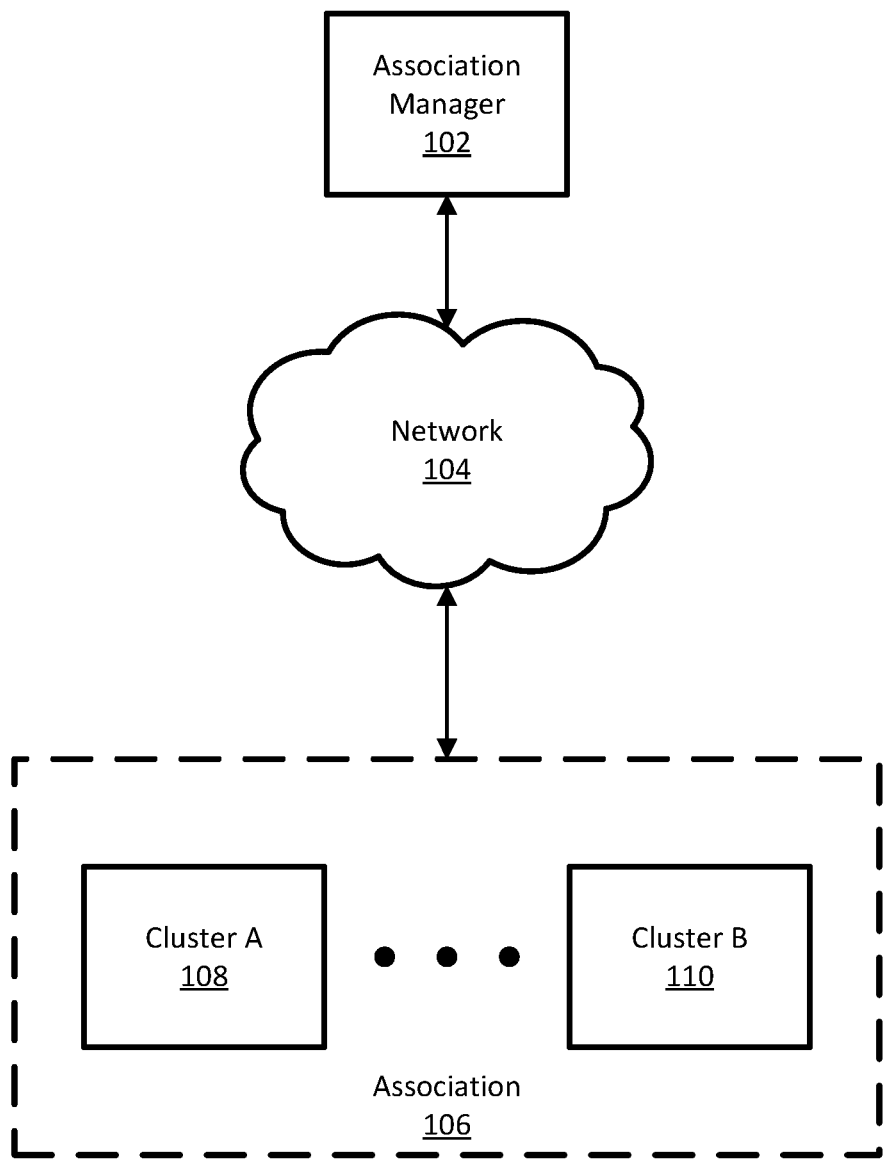
FIG. 1 shows a diagram of a system, in accordance with one or more embodiments of the invention.

Specific embodiments will now be described with reference to the accompanying figures. In the following description, numerous details are set forth as examples of the invention. One of ordinary skill in the art, having the benefit of this detailed description, would appreciate that one or more embodiments of the present invention may be practiced without these specific details and that numerous variations or modifications may be possible without departing from the scope of the invention. Certain details known to those of ordinary skill in the art may be omitted to avoid obscuring the description.

In the following description of the figures, any component described with regard to a figure, in various embodiments of the invention, may be equivalent to one or more like-named components shown and/or described with regard to any other figure. For brevity, descriptions of these components may not be repeated with regard to each figure. Thus, each and every embodiment of the components of each figure is incorporated by reference and assumed to be optionally present within every other figure having one or more like-named components. Additionally, in accordance with various embodiments of the invention, any description of any component of a figure is to be interpreted as an optional embodiment, which may be implemented in addition to, in conjunction with, or in place of the embodiments described with regard to a corresponding like-named component in any other figure.

Throughout the application, ordinal numbers (e.g., first, second, third, etc.) may be used as an adjective for an element (i.e., any noun in the application). The use of ordinal numbers is not to imply or create any particular ordering of the elements nor to limit any element to being only a single element unless expressly disclosed, such as by the use of the terms "before", "after", "single", and other such terminology. Rather, the use of ordinal numbers is to distinguish between the elements. By way of an example, a first element is distinct from a second element, and the first element may encompass more than one element and succeed (or precede) the second element in an ordering of elements.

As used herein, the term 'operatively connected', or 'operative connection', means that there exists between elements/components/devices a direct or indirect connection that allows the elements to interact with one another in some way (e.g., via the exchange of information). For example, the phrase 'operatively connected' may refer to any direct (e.g., wired or wireless connection directly between two devices) or indirect (e.g., wired and/or wireless connections between any number of devices connecting the operatively connected devices) connection.

In general, embodiments of the invention relate to systems, devices, and methods for adding a cluster to an association without user configuration and managing the data of one or more clusters by intelligently copying data between clusters. Embodiments of the invention described herein allow for, at least, adding a new cluster to an existing association. Further, various embodiments of the invention enable copying data among clusters to more efficiently service requests for that data.

FIG. 1 shows a diagram of a system, in accordance with one or more embodiments of the invention. The system may include association manager (102) operatively connected to network (104) which is also operatively connected to an association (106), and/or one or more clusters (108, 110) thereof. Each of these components is described below.

In one or more embodiments of the invention, an association manager (e.g., association manager (102)) is hardware configured to manage and/or initiate connections to one or more association(s) (106). In one embodiment of the invention, association manager (102) is implemented as a computing device. Each computing device may include one or more processor(s), memory (e.g., random access memory), and persistent storage (e.g., disk drives, solid state drives, etc.). The persistent storage may store computer instructions, (e.g., computer code) which, when executed by the processor(s) of the computing device, causes the computing device to issue one or more requests and to receive one or more responses. Examples of a computing device include a mobile phone, tablet computer, laptop computer, desktop computer, server, distributed computing system, or cloud resource. In one embodiment of the invention, an association manager (e.g., association manager (102)) is configured to perform all, or a portion, of the functionality described in FIG. 8.

In one or more embodiments of the invention, a network (e.g., network (104)) is a collection of connected network devices (not shown) that allow for the communication of data from one network device (not shown) to other network devices (not shown), or the sharing of resources among network devices (not shown). Examples of a network (e.g., network (104)) include, but are not limited to, a local area network (LAN), a wide area network (WAN) (e.g., the Internet), a mobile network, or any other type of network that allows for the communication of data and sharing of resources among network devices and/or devices operatively connected to the network (104).

In one or more embodiments of the invention, an association (106) is a collection of two or more operatively connected clusters (108, 110). Clusters (108, 110) of association (106) may be operatively connected via network (104) (e.g., the same LAN, operatively connected via a WAN, or grouped within several LANs, each of which is operatively connected via a WAN). One of ordinary skill in the art, having the benefit of this detailed description, will appreciate that the clusters (108, 110) may be operatively connected via one or more forms of communication. As used herein, the term "network connection" refers to the operative connection between two clusters (108, 110) via a network (e.g., network (104)). Further, as used herein, the term "network path" refers to the combination of one or more individual "network connection(s)" that operatively connect two or more clusters (108, 110).

In one or more embodiments of the invention, a cluster (108, 110) is a collection of two or more operatively connected node(s) (not shown) and a cluster manager (not shown). Node(s) (not shown) of a cluster (108, 110) may be operatively connected via a network (e.g., network (104)). In one embodiment of the invention, a cluster (e.g., cluster A (108), cluster B (110)) is configured to perform all, or a portion, of the functionality described in FIG. 2.

While FIG. 1 shows a specific configuration of a system, other configurations may be used without departing from the scope of the invention. Accordingly, embodiments disclosed herein should not be limited to the configuration of devices and/or components shown in FIG. 1.

Figure 2:
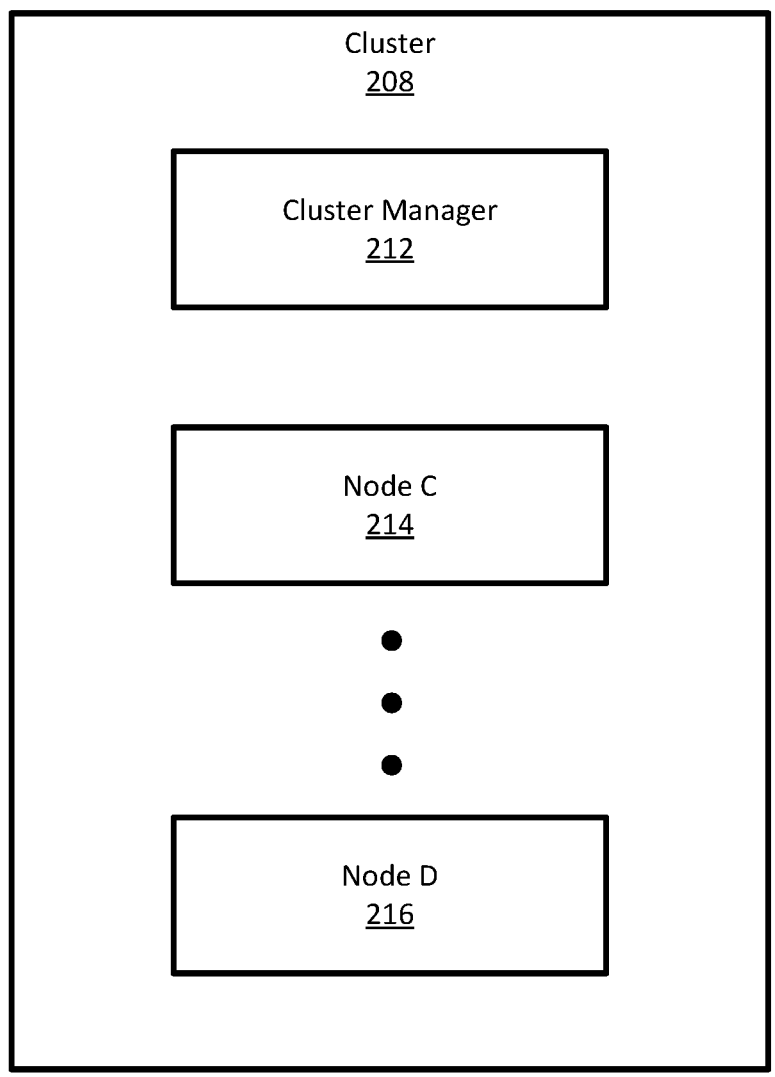
FIG. 2 shows a diagram of a cluster, in accordance with one or more embodiments of the invention.

FIG. 2 shows a diagram of a cluster (e.g., cluster (208)), in accordance with one or more embodiments of the invention. In one or more embodiments of the invention, cluster (208) may include cluster manager (212), node C (214), and node D (216), each of which may be operatively connected via a network (not shown). Each of these components is described below.

In one embodiment of the invention, a cluster manager (e.g., cluster manager (212)) is hardware configured to manage and/or initiate connections to an association (not shown) and/or manage and/or coordinate functions with other clusters (not shown) of an association. In one or more embodiments of the invention, cluster manager (212) is implemented as a computing device (as discussed above in the description of FIG. 1).

In one or more embodiments of the invention, a cluster manager (e.g., cluster manager (212)) maintains an association cluster list (not shown) and/or a network metrics data structure (not shown) that include information about other clusters in the association (not shown) to which the cluster (208) belongs. In one embodiment of the invention, a cluster manager (e.g., cluster manager (212)) is configured to perform all, or a portion, of the functionality described in FIGS. 7, 9, 10, and/or 11.

In one embodiment of the invention, a node (e.g., node C (214), node D (216)) is implemented as a computing device (as discussed above in the description of FIG. 1) and may perform various functions within a cluster. In one embodiment of the invention, a node of the cluster may provide storage and computing services for any purpose which a cloud resource might be utilized.

While FIG. 2 shows a specific configuration of a cluster, other configurations may be used without departing from the scope of the invention. Accordingly, embodiments disclosed herein should not be limited to the configuration of devices and/or components shown in FIG. 2.

Figure 3:
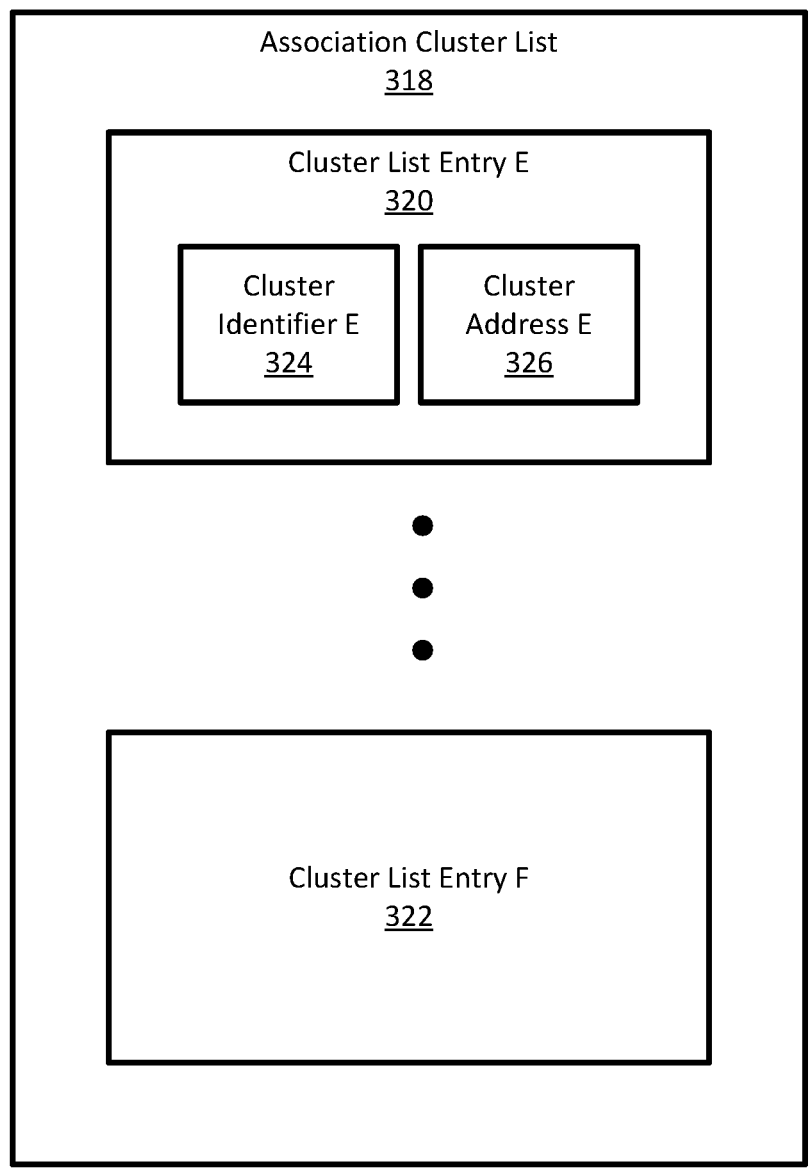
FIG. 3 shows a diagram of an association cluster list, in accordance with one or more embodiments of the invention.

FIG. 3 shows a diagram of an association cluster list (e.g., association cluster list (318)), in accordance with one or more embodiments of the invention. In one embodiment of the invention, an association cluster list (318) is a data structure maintained by a cluster manager (not shown) that includes data specific to other clusters within the association. Association cluster list (318) may include one or more cluster list entries (e.g., cluster list entry E (320), cluster list entry F (322)), described below.

In one or more embodiments of the invention, a cluster list entry (e.g., cluster list entry E (320), cluster list entry F (322)) is a single entry that is specific to one other cluster within the association. In one embodiment of the invention, each cluster manager maintains an association cluster list (318) that includes one or more cluster list entries (320, 322) specific to each other cluster within the association to which those clusters mutually belong (e.g., the association that includes the cluster maintaining the association cluster list (318) and the other clusters). In one or more embodiments of the invention, an association cluster list (e.g., association cluster list (318)), as maintained by a cluster manager, may be incomplete (i.e., not including an up-to-date list of cluster(s) within the association) and include information about other clusters that is no longer correct (e.g., outdated information).

In one or more embodiments of the invention, a cluster identifier (e.g., cluster identifier E (324)) is a unique identifier associated with a single cluster (and/or cluster manager). In one embodiment of the invention, a cluster identifier (324) is a unique number assigned to a cluster that allows for the cluster manager to uniquely identify that cluster. Further, in one embodiment of the invention, each cluster identifier (e.g., cluster identifier E (324)) may be a number of equal length (e.g., a 5, 10, or 20 digit number) that provides uniformity for two or more clusters of the association cluster list (318). One of ordinary skill in the art, having the benefit of this detailed description, would appreciate that a cluster identifier may be any text expression and/or numerical value that is unique to the associated cluster.

In one or more embodiments of the invention, a cluster address (e.g., cluster address E (326)) is a unique address (e.g., an IP address) associated with a cluster (and/or cluster manager thereof). Specifically, each cluster within an association may be assigned a unique address (e.g., an IP address) to be used when utilizing one or more protocols of a network that operatively connects the clusters of the association. In one or more embodiments of the invention, cluster address E (326) is unique to the same cluster identified by cluster identifier E (324) (as both belong to cluster list entry E (320)).

While FIG. 3 shows a specific configuration of an association cluster list, other configurations may be used without departing from the scope of the invention. Accordingly, embodiments disclosed herein should not be limited to the configuration of devices and/or components shown in FIG. 3.

Figure 4:
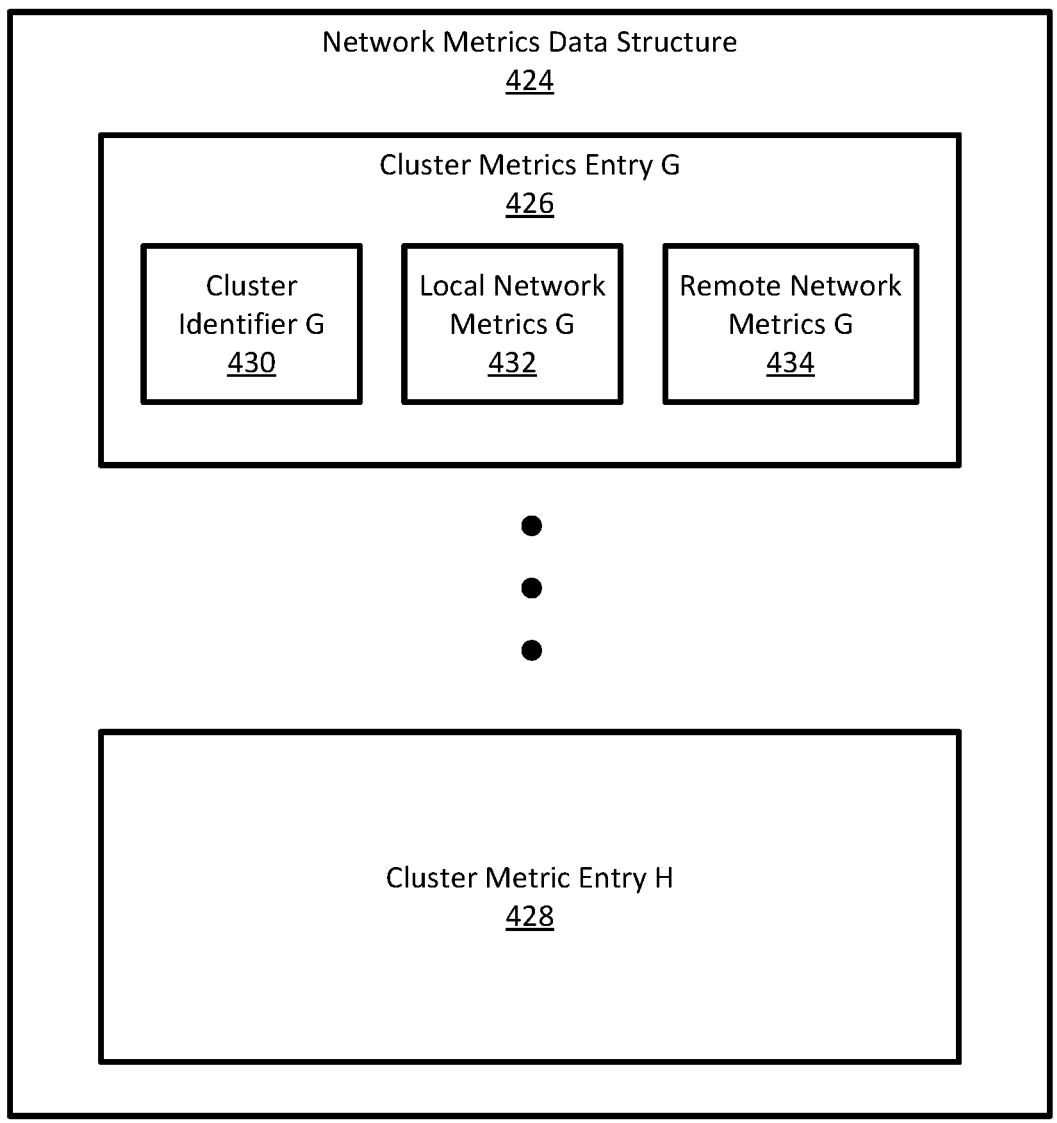
FIG. 4 shows a diagram of a network metrics data structure, in accordance with one or more embodiments of the invention.

FIG. 4 shows a diagram of a network metrics data structure (e.g., network metrics data structure (424)), in accordance with one or more embodiments of the invention. In one embodiment of the invention, a network metrics data structure (424) is a data structure maintained by a cluster manager (not shown) that includes data indicating quantitative and/or qualitative information about one or more network connections that operatively connect two or more clusters. Network metrics data structure (424) may include one or more cluster metrics entries (e.g., cluster metrics entry G (426), cluster metrics entry H (428)), described below.

In one or more embodiments of the invention, a cluster metrics entry (e.g., cluster metrics entry G (426), cluster metrics entry H (428)) is an entry that is specific to one other cluster within the association. In one embodiment of the invention, each cluster manager maintains a network metrics data structure (424) that includes one or more cluster metrics entries (426, 428) specific to each other cluster within the association to which those clusters mutually belong (e.g., the association that includes the cluster maintaining network metrics data structure (424) and the other clusters). In one or more embodiments of the invention, a network metrics data structure (e.g., network metrics data structure (424)), as maintained by a cluster manager, may be incomplete (i.e., not including an up-to-date list of cluster(s) within the association) and include information about other clusters that is no longer correct (e.g., outdated information).

In one or more embodiments of the invention, cluster identifier (e.g., cluster identifier G (324)) has all of the same properties and purpose as discussed in the description of FIG. 3 (e.g., cluster identifier E (324)).

In one or more embodiments of the invention, local network metrics (e.g., local network metrics G (432)) is a data structure that includes network metrics relating to one or more network connection between the cluster maintaining the network metrics data structure (424) and the unique cluster associated with the cluster metrics entry (e.g., cluster metrics entry G (426)). For example, in one embodiment of the invention, if the cluster manager maintaining the network metrics data structure (424) belongs to "cluster A", and local network metrics G (432) is specific to "cluster G", local network metrics G (432) would therefore include data relating to one or more network connection(s) between "cluster A" and "cluster G".

In one or more embodiments of the invention, network metrics are quantitative and/or qualitative measurements of one or more properties of one or more network connection(s). Examples of network metrics include, but are not limited to, round trip time (RTT), path length, bandwidth, load, number of hops (e.g., "hop count"), path cost, maximum transmission unit (MTU), reliability, communications cost, link utilization (e.g., using simple network management protocol (SNMP)), speed of the path, packet loss, latency (e.g., delay), and/or throughput.

In one or more embodiments of the invention, remote network metrics (e.g., remote network metrics G (434)) is a data structure that includes network metrics relating to one or more network connection between the unique cluster associated with the cluster metrics entry (e.g., cluster metrics entry G (426)) and one or more other clusters within the association (i.e., not the cluster maintaining the network metrics data structure (424)). For example, in one embodiment of the invention, the cluster manager maintaining the network metrics data structure (424) may belong to "cluster A" and remote network metrics G (434) is specific to "cluster G". In this case, remote network metrics G (434) includes network metrics relating to the network connection(s) between "cluster G" and other clusters that are not "cluster A" (e.g., "cluster B", "cluster C", etc.). Thus, in one embodiment of the invention, the cluster manager maintaining the network metrics data structure (424) is able to obtain network metrics relating to one or more network connection(s) between two remote clusters within the association. Alternatively, in one embodiment of the invention, remote network metrics (e.g., remote network metrics G (434)) may include data relating to the network connection(s) between two remote clusters, excluding the remote cluster from which the remote network metrics (e.g., remote network metrics G (434)) was received.

Further, in one embodiment of the invention, when two or more cluster metrics entries (426, 428) exist (each including local network metrics (e.g., 432) and remote network metrics (e.g., 434)), it is possible to generate network path trees and/or other data structures relating to the topology of the association, as a whole. That is, while a single cluster may only be able to directly measure local network metrics (e.g., local network metrics G (432)) for each cluster within an association, the cluster (and/or cluster manager thereof) is, nonetheless, able to receive and utilize one or more remote network metrics (e.g., remote network metrics G (434)) to potentially determine more optimal paths to one or more clusters via paths identified in those remote network metrics (434).

Additionally, in one or more embodiments of the invention, a cluster manager is able to identify two or more network paths from the local cluster (the cluster to which the cluster manager belongs) to a second cluster. For example, while it is assumed that there exists a direct network connection between the local cluster and the second cluster (e.g., a connection that does not traverse a third cluster), a cluster manager is able to identify other network paths from the local cluster to the second cluster (e.g., via one or more other clusters) that provide a path that may be preferential based on the associated network metrics of those network connection(s).

While FIG. 4 shows a specific configuration of a network metrics data structure, other configurations may be used without departing from the scope of the invention. Accordingly, embodiments disclosed herein should not be limited to the configuration of devices and/or components shown in FIG. 4.

Figures 5A, 5B, 5C:
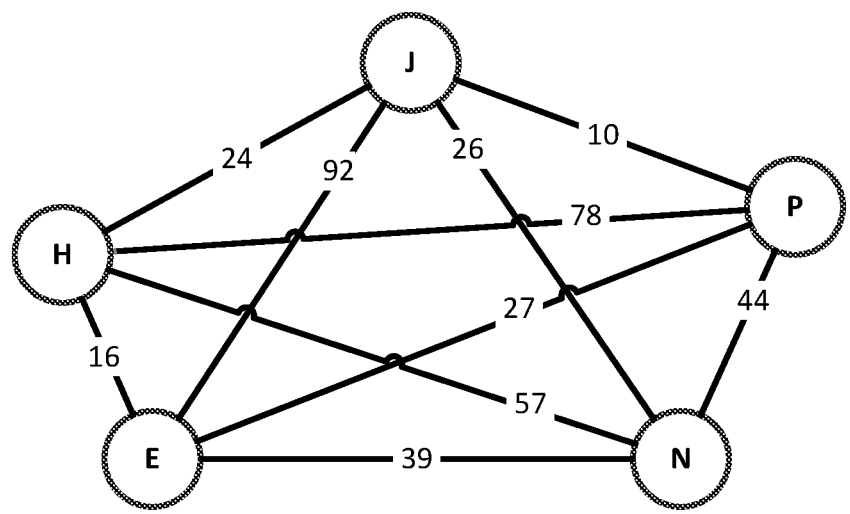
FIG. 5A shows an example, in accordance with one or more embodiments of the invention.
FIG. 5B shows an example, in accordance with one or more embodiments of the invention.
FIG. 5C shows an example, in accordance with one or more embodiments of the invention.

FIG. 5A shows an example of a network metrics data structure, in accordance with one or more embodiments of the invention. Specifically, in one or more embodiments of the invention, FIG. 5A shows an example of a network metrics data structure (including both local network metrics and remote network metrics), as discussed in the description of FIG. 4.

The network metrics data structure, shown in FIG. 5A, provides a table relating five unique clusters (H, J, P, N, and E) and single network metric thereof, for example, RTT (measured in milliseconds). Further, although each cluster manager may maintain a similar network metrics data structure, the designation of which network metrics are considered 'local' and which network metrics are considered 'remote' is a matter of perspective of the cluster manager that maintains the network metric data structure. For example, if "cluster E" is maintaining the network metrics data structure of FIG. 5A, the first row is then considered to be "local network metrics", and every other value of the table (providing metrics between two clusters, neither of which are "cluster E") is considered "remote network metrics" (e.g., those values which the cluster manager of cluster E would not be able to directly measure). Conversely, if "cluster H" is maintaining the network metrics data structure of FIG. 5A, the first column is then considered to be "local network metrics", and every other value of the table (providing metrics between two clusters, neither of which are "cluster H") is considered "remote network metrics" (e.g., those values which the cluster manager of cluster H would not be able to directly measure).

One of ordinary skill in the art, having the benefit of this detailed description, would appreciate that the example provided in FIG. 5A is an example table layout relating to only a single network metric for five specific clusters and that network metrics may be stored in any sufficiently suitable data structure and include many more network metrics relating to more or less clusters.

While FIG. 5A shows a specific example of a network metrics data structure, other configurations may be used without departing from the scope of the invention. Accordingly, embodiments disclosed herein should not be limited to the configuration of devices and/or components shown in FIG. 5A.

FIG. 5B shows an example of a visual representation of a network tree, in accordance with one or more embodiments of the invention. Specifically, in one or more embodiments of the invention, FIG. 5B shows an example of a network tree generated from the network metrics data structure discussed in the description of FIG. 5A.

Continuing with the example, FIG. 5B shows a visual representation of the five unique clusters (H, J, P, N, and E) and the ten network connections that operatively link each of those five clusters. Further, each network connection is labeled with the values of the table shown in FIG. 5A. For example, in FIG. 5A, the network connection between cluster E and cluster H is indicated to have an RTT of 16 ms, thus, the line directly connecting cluster E and cluster H is labeled "16".

One of ordinary skill in the art, having the benefit of this detailed description, would appreciate that the example provided in FIG. 5B is an example of a visual representation of network tree, and that a cluster manager may not actually generate a visual representation from the network metrics data structure. Thus, in one embodiment of the invention, the network metrics data structure, alone, may be used to store the metrics regarding one or more network connections(s) operatively connecting two clusters.

While FIG. 5B shows a specific example of a network tree, other configurations may be used without departing from the scope of the invention. Accordingly, embodiments disclosed herein should not be limited to the configuration of devices and/or components shown in FIG. 5B.

FIG. 5C shows an example of a data structure that includes a list of multiple network paths from cluster J to cluster E, in accordance with one or more embodiments of the invention. Specifically, in one or more embodiments of the invention, FIG. 5C shows an example of a multiple network paths from cluster J to cluster E generated from the network metrics data structure discussed in the description of FIG. 5A.

Continuing with the example, each entry in the data structure of FIG. 5C provides the individual and combined network metrics associated with each network connection along that path. For example, the RTT directly between cluster J and cluster E is 92 ms (as indicated by the "92" on the line connecting "J" and "E"). Alternatively, the RTT directly between cluster J and cluster N is 26 ms (as indicated by the "26" on the line connecting "J" and "N") and the RTT directly between cluster N and cluster E is 39 ms (as indicated by the "39" on the line connecting "N" and "E"). Thus, as can be seen in the fourth entry of the table ("J-N-E"), the combined RTT from cluster J to cluster E, indirectly via cluster N, is 26+39 =65 ms.

In one embodiment of the invention, as shown in FIG. 5C, the third entry of the table ("J-P-E") (bolded) shows the RTTs of the network path from cluster J to cluster P to cluster E, where path "J-P-E" provides the least total RTT of all available paths from cluster J to cluster E. That is, using the network connection from cluster J to cluster P, then the network connection from cluster P to cluster E provides a network path with a RTT of 37 ms (lower than any other possible path between cluster J and cluster E). Accordingly, in one embodiment of the invention, the network metrics data structure may be used to identify one network path (e.g., an individual network connection or series of network connections between two clusters) optimized for a particular network metric (e.g., RTT).

One of ordinary skill in the art, having the benefit of this detailed description, would appreciate that the example provided in FIG. 5C is an example of a data structure that includes a list of multiple network paths from cluster J to cluster E and that a cluster manager may not actually generate such a list, but rather a cluster manager may use an existing network metrics data structure (e.g., FIG. 5A) to determine individual and combined network metrics. Thus, in one embodiment of the invention, the network metrics data structure, alone, may be used to store the metrics regarding one or more network connections(s) operatively connecting two clusters.

While FIG. 5C shows a specific example of a network tree, other configurations may be used without departing from the scope of the invention. Accordingly, embodiments disclosed herein should not be limited to the configuration of devices and/or components shown in FIG. 5C.

Figure 6:
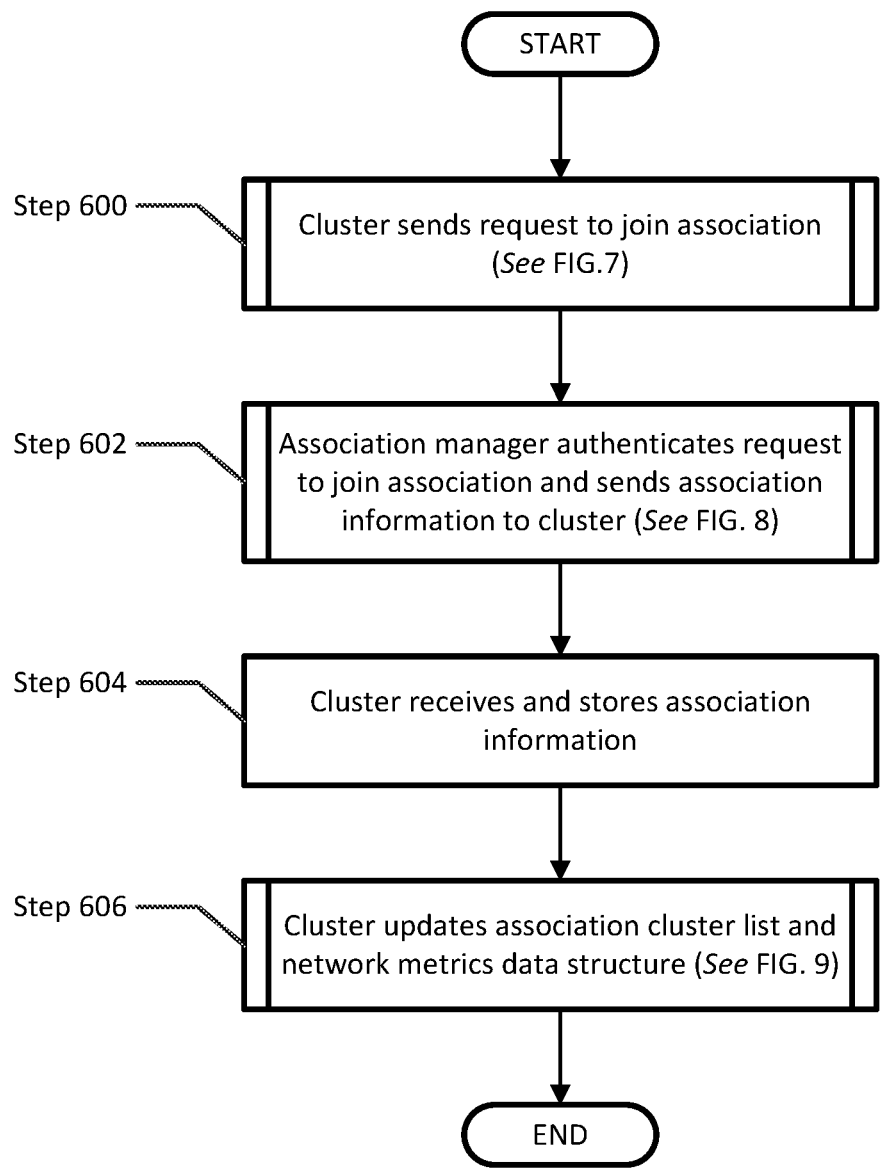
FIG. 6 shows a flowchart of a method of interacting with an association, in accordance with one or more embodiments of the invention.

FIG. 6 shows a flowchart of a method of interacting with an association, in accordance with one or more embodiments of the invention. All or a portion of the method shown in FIG. 6 may be performed by one or more components of the association manager and/or a cluster manager. Another component of the system may perform this method without departing from the invention. While the various steps in this flowchart are presented and described sequentially, one of ordinary skill in the relevant art will appreciate that some or all of the steps may be executed in different orders, may be combined or omitted, and some or all steps may be executed in parallel.

In Step 600, a cluster (and/or the cluster manager thereof) sends a request to join an association. Details regarding the process of Step 600 are discussed in the description of FIG. 7.

In Step 602, an association manager authenticates the request to join the association (received from the cluster manager) and, in reply, sends association information back to the cluster manager. Details regarding the process of Step 602 are discussed in the description of FIG. 8.

In Step 604, the cluster (and/or the cluster manager thereof) receives the association information sent by the association manager at Step 602. In one or more embodiments of the invention, the cluster may only receive the association information after the cluster manager's request to join the association (sent at Step 600) is properly authenticated by the association manager.

In Step 606, the cluster manager updates the association cluster list and network metrics data structure maintained by the cluster manager. Details regarding the process of Step 606 are discussed in the description of FIG. 9.

Figure 7:
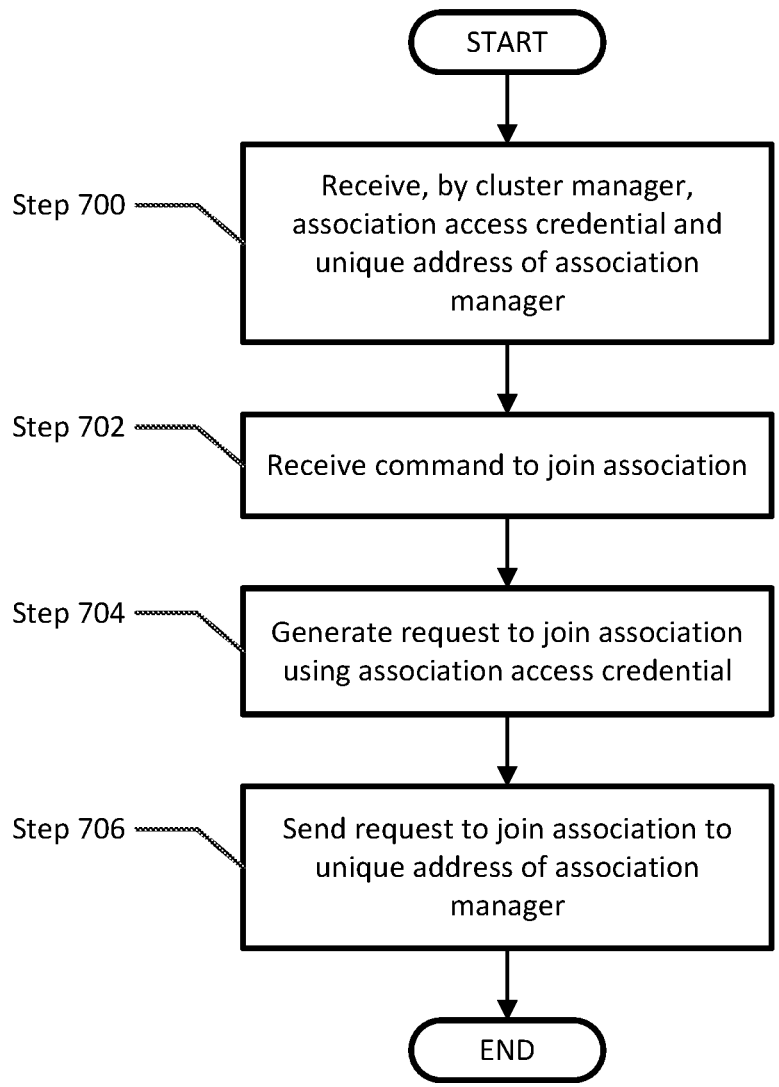
FIG. 7 shows a flowchart of a method of requesting to join an association, in accordance with one or more embodiments of the invention.

FIG. 7 shows a flowchart of a method of requesting to join an association, in accordance with one or more embodiments of the invention. All or a portion of the method shown in FIG. 7 may be performed by one or more components of the cluster manager. Another component of the system may perform this method without departing from the invention. While the various steps in this flowchart are presented and described sequentially, one of ordinary skill in the relevant art will appreciate that some or all of the steps may be executed in different orders, may be combined or omitted, and some or all steps may be executed in parallel.

In Step 700, a cluster manager receives an association access credential and a unique address of an association manager. In one or more embodiments of the invention, prior to a cluster manager attempting to join an association, the cluster manager must first obtain information necessary to join that association (e.g., association access credential and a unique address of an association manager) so that a proper request to join an association may be generated.

In one or more embodiments of the invention, the association access credential is data that is stored by the cluster manager, known to the association manager, but not known generally. Thus, in one embodiment of the invention, the association access credential may be considered "shared secret" in that only the two entities (the cluster manager and the association manager) are configured to verify the value of the data when received. Examples of an association access credential include, but are not limited to, a one-time use cookie, a password, a unique key, and/or any other data which may be used by one device to verify the authenticity of a message sent by another device.

In one or more embodiments of the invention, the unique address of an association manager is an address (e.g., an IP address) accessible via a WAN (e.g., the internet). In one embodiment of the invention, the unique address of an association manager may be a domain name (or subdomain) specific to that association manager (e.g., "assoc5.example.com") thereby providing a more durable WAN address of the association manager.

In one or more embodiments of the invention, the association access credential and a unique address of the association manager may be stored on the cluster manager when initially configured (e.g., pre-loaded by the manufacturer) and configured to load upon startup of the cluster manager (e.g., "bootstrapped"). Thus, in one embodiment of the invention, when a user (e.g., a network administrator) of the cluster manager desires for the cluster to join an association, the user is not burdened by a requirement to configure the cluster manager with the association access credential and a unique address of the association manager. Rather, as the required information is already pre-loaded onto the cluster manager, little user input is required (therefore leaving less opportunity for user error). Alternatively, in one embodiment of the invention, the association access credential and the unique address of an association manager may be provided to the cluster manager by a user of the system.

In Step 702, the cluster manager receives a command to join an association. In one or more embodiments of the invention, the command to join an association may merely request that the cluster manager join an association, as the specific association and information required to join is already stored within the cluster manager. Alternatively, in one embodiment of the invention, the command to join an association may specify the specific association to be joined, which is then verified by the existing association access credential and a unique address of an association manager.

In one or more embodiments of the invention, the command to join an association may be received by a user of the cluster (e.g., a network administrator); or alternatively, in one embodiment of the invention, the command to join an association may be automatically generated and initiated upon initial setup of the cluster.

In Step 704, the cluster manager generates a request to join the association using the association access credential. In one or more embodiments of the invention, the cluster manager generates the message by including the association access credential, or a hash of the association access credential, in a message to be sent to the association manager. One of ordinary skill in the art, having the benefit of this detailed description, would appreciate that generating the request to join the association may include, the utilization, manipulation, and/or generation of additional data based on the association access credential.

In Step 706, the cluster manager sends the request to join the association to the association manager. In one or more embodiments of the invention, the request to join the association includes the association access credential and is sent to the unique address of an association manager received by the cluster manager at Step 700. In one embodiment of the invention, the request to join the association is sent via an operative connection between the cluster manager and the association manager.

Figure 8:
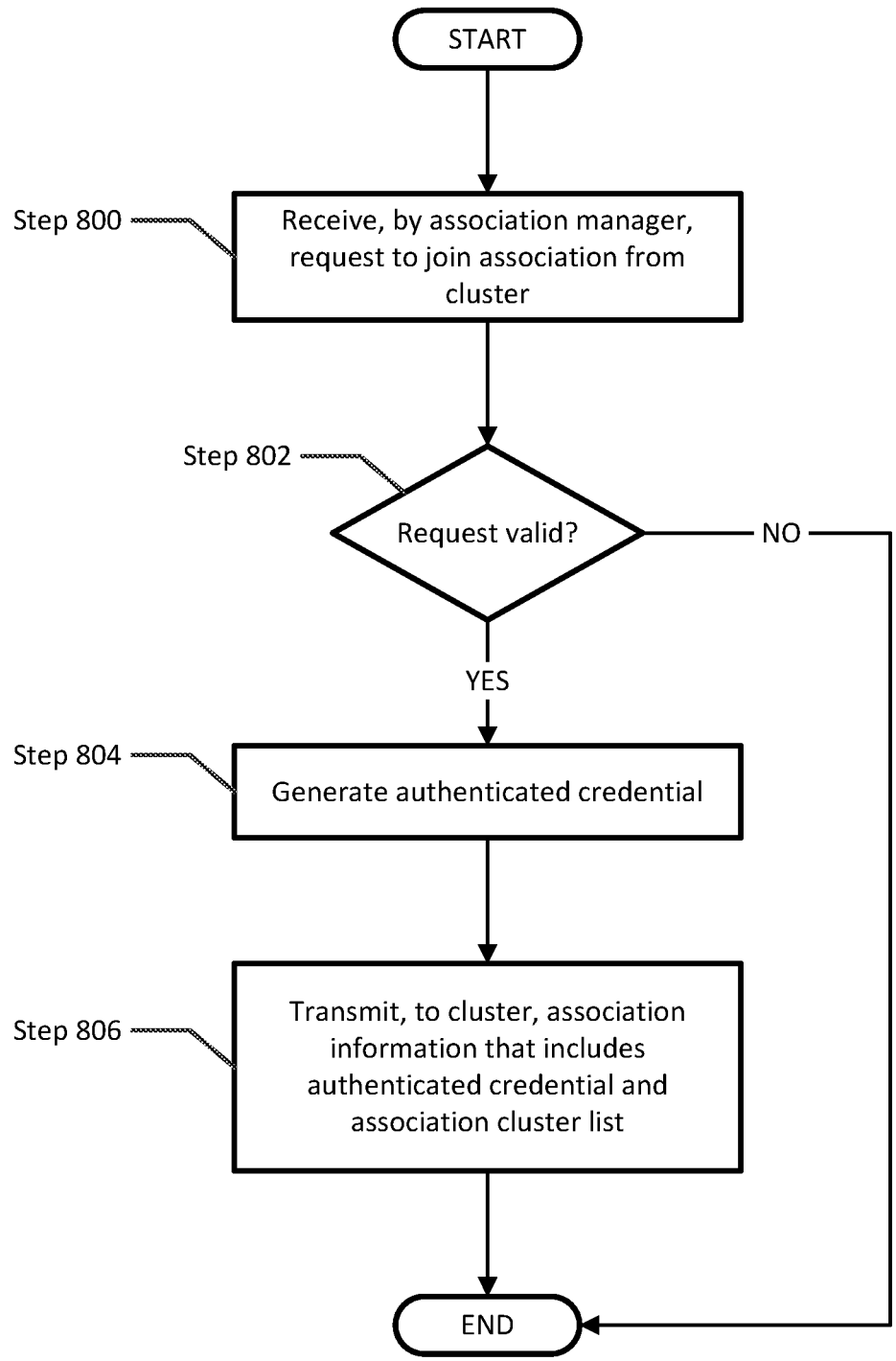
FIG. 8 shows a flowchart of a method of authenticating a request to join an association, in accordance with one or more embodiments of the invention.

FIG. 8 shows a flowchart of a method of authenticating a request to join an association, in accordance with one or more embodiments of the invention. All or a portion of the method shown in FIG. 8 may be performed by one or more components of the association manager. Another component of the system may perform this method without departing from the invention. While the various steps in this flowchart are presented and described sequentially, one of ordinary skill in the relevant art will appreciate that some or all of the steps may be executed in different orders, may be combined or omitted, and some or all steps may be executed in parallel.

In Step 800, an association manager receives a request, from a cluster manager, to join an association. In one or more embodiments of the invention, the request to join the association includes an association access credential that is specific to the cluster (and/or cluster manager thereof) that is requesting to join the association.

In Step 802, the association manager determines if the request to join the association is valid. In one or more embodiments of the invention, the association manager determines if the request is valid by verifying that the association access credential, received in the request, matches the known association access credential value associated with the requesting cluster manager.

In one or more embodiments of the invention, as discussed in the description of Step 700, the association manager is configured to identify the association access credential, as it also independently stored by the association manager. Alternatively, in one embodiment of the invention, the association manager may receive a hash value of the association access credential; and, in this case, the association manager may perform the same hash function on the stored value of the association access credential to determine if the received hash value matches the calculated hash value.

Further, in one embodiment of the invention, the association manager verifies that the association access credential is sent by the cluster manager that is associated with the specific association access credential. That is, in one embodiment of the invention, a nefarious actor may use an ill-obtained association access credential, but may still be unable to spoof the cluster manager from which the request must be sent. Thus, in one embodiment of the invention, the association manager rejects the request as invalid because the (otherwise valid) association access credential is received by a device that is not associated with that received association access credential.

If the request is not determined to be valid (802-NO), the process ends. Alternatively, if the request is determined to be valid (802-YES), the process proceeds to Step 804.

In Step 804, the association manager generates an authenticated credential for the cluster manager. In one or more embodiments of the invention, the authenticated credential is unique to the cluster manager (and/or the cluster to which the cluster manager belongs) and is to be used by the cluster manager when communicating with other clusters of the association. Further, in one or more embodiments of the invention, the authenticated credential is unique to the association specified in the request received at Step 800, for which the authenticated credential was generated.

In one or more embodiments of the invention, an authenticated credential is data that the cluster manager may utilize to provide verification, to other clusters, that the cluster manager is the device which it claims to be. In one embodiment of the invention, as the clusters are communicating via insecure network connections (e.g., via the Internet), there are one or more possible vulnerabilities that may be exploited. To prevent some of these threats, all communications sent from the cluster manager utilize the authenticated credential provided by the association manager to verify that data to and from the cluster manager is, in fact, being sent to and from the cluster manager. For example, an authenticated credential may be a signed certificate (e.g., signed by the association manager) for which each device receiving the authenticated credential may verify the authenticity of the message by utilizing the association manager's known verification scheme.

In Step 806, the association manager sends association information to the cluster manager. In one or more embodiments of the invention, association information includes the authenticated credential and an association cluster list, maintained by the association manager. In one or more embodiments of the invention, the association cluster list, sent by the association manager, has all of the same properties and purpose as discussed in the description of FIG. 3 (e.g., association cluster list (318)).

Figure 9:
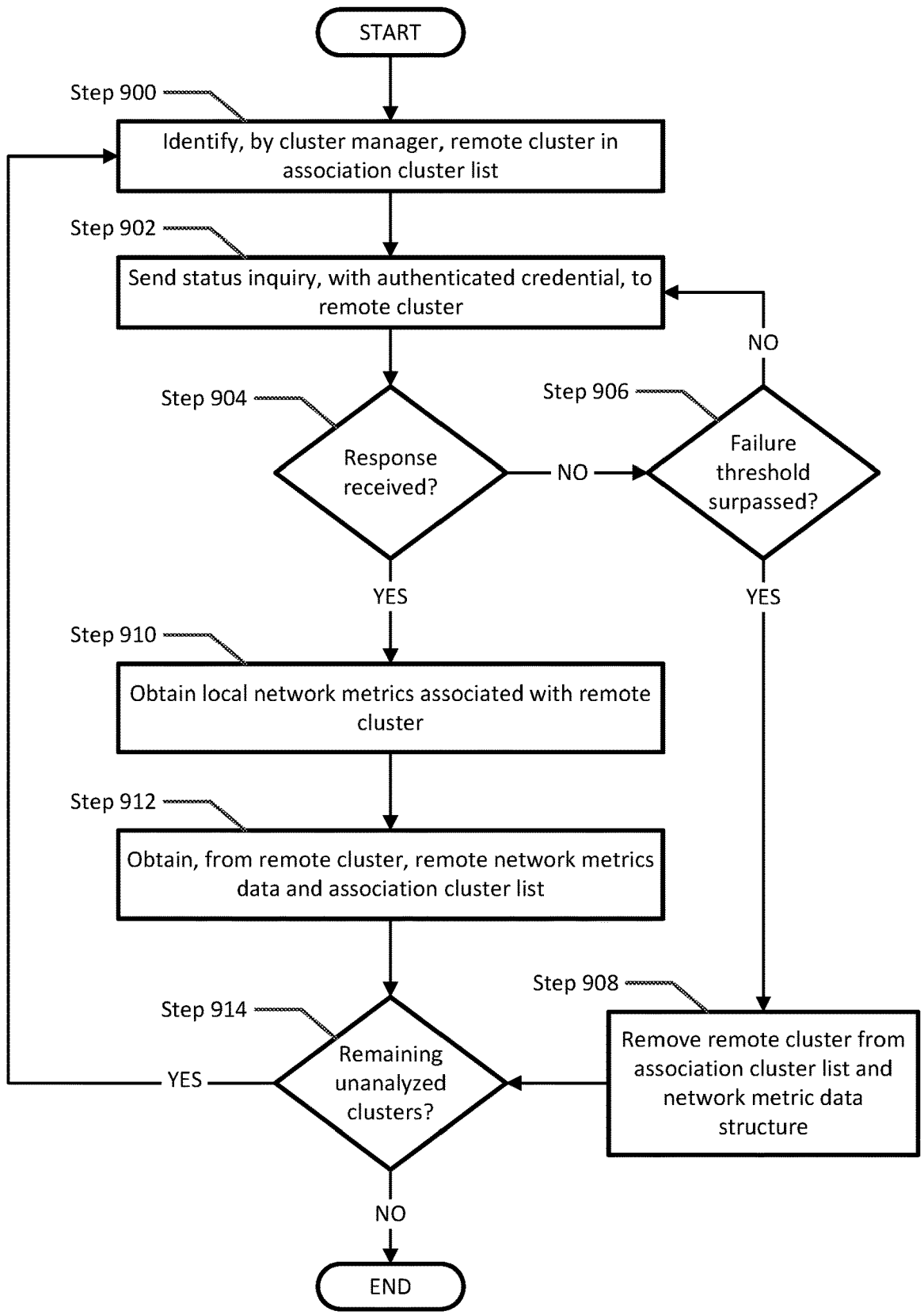
FIG. 9 shows a flowchart of a method of updating a network metrics data structure, in accordance with one or more embodiments of the invention.

FIG. 9 shows a flowchart of a method of interacting with an association, in accordance with one or more embodiments of the invention. All or a portion of the method shown in FIG. 9 may be performed by one or more components of the cluster manager. Another component of the system may perform this method without departing from the invention. While the various steps in this flowchart are presented and described sequentially, one of ordinary skill in the relevant art will appreciate that some or all of the steps may be executed in different orders, may be combined or omitted, and some or all steps may be executed in parallel.

In Step 900, a cluster manager identifies a remote cluster in the locally maintained association cluster list. In one or more embodiments of the invention, the cluster manager may perform a lookup in the association cluster list and/or network metrics data structure to identify a remote cluster with absent and/or outdated network metrics. In one or more embodiments of the invention, the cluster manager may continually monitor the network metrics data structure to identify remote clusters, in the association, for which the associated data is absent and/or outdated.

In Step 902, the cluster manager sends a status inquiry to the remote cluster identified in Step 902. In one or more embodiments of the invention, a status inquiry may include, or be transmitted with, a copy of the authenticated credential unique to the cluster to authenticate membership within the association.

In one or more embodiments of the invention, a status inquiry is one or more message(s) and/or network communication(s) sent from one cluster in an association to another cluster in that same association. The status inquiry may include a request for a copy of the association cluster list and network metrics data structure maintained by the other cluster. Further, in one embodiment of the invention, the status inquiry may further include additional network communications intended to measure the network metrics between the two clusters. Thus, in one embodiment of the invention, a status inquiry is a series of communications that includes requests for data maintained by a remote cluster manager and/or data transmitted purely for diagnostic purposes (e.g., a ping) to measure a metric of the network connection between clusters.

In Step 904, the cluster manager determines whether a response has been received from the remote cluster. In one or more embodiments of the invention, the cluster manager waits for a response to the status inquiry from the remote cluster for a certain period of time before the cluster manager assumes the status inquiry was not received (and/or the status inquiry was not sent). If a response to the status inquiry is received (904-YES), the process proceeds to Step 910. Alternatively, if a response to the status inquiry is not received (904-NO), the process proceeds to Step 906.

In Step 906, the cluster manager determines if a failure threshold for the communication with the remote cluster has been surpassed. In one or more embodiments of the invention, the cluster manager is configured to attempt to send multiple status inquiries to a remote cluster in an attempt to receive a response.

In one embodiment of the invention, the failure threshold may be measured by a number of attempts (e.g., number of status inquires sent without a response), an overall time for which communication has been attempted, and/or any other indication that communication with the remote cluster is likely not feasible. If the failure threshold is surpassed (906-YES), the process proceeds to Step 908. Alternatively, if the failure threshold is not surpassed (906-NO), the process returns back to Step 902.

In Step 908, the cluster manager removes the remote cluster (identified at Step 900) from the association cluster list and network metrics data structure. In one or more embodiments of the invention, if the failure threshold for communicating with a remote cluster is surpassed (906-YES), it is assumed that remote cluster is no longer accessible, is therefore no longer part of the association, and thus needs to be removed from the association cluster list and network metrics data structure.

In Step 910, the cluster manager obtains local network metrics relating to the remote cluster. In one or more embodiments of the invention, as discussed in the description of FIG. 4, local network metrics is a data structure that includes network metrics relating to the network connection between the cluster (that sent the status inquiry) and a remote cluster (that received the status inquiry).

In one embodiment of the invention, obtaining local network metrics does not require the remote cluster to perform any action in response to receiving the status inquiry. Rather, in one embodiment of the invention, local network metrics are measured by the cluster manager, using the network connection operatively connecting the two clusters, without requesting the transmission of any data maintained by the remote cluster manager.

In Step 912, the cluster manager receives the remote network metrics and association cluster list maintained by the cluster manager of the remote cluster. In one or more embodiments of the invention, the cluster manager may send the entire network metrics data structure maintained by the remote cluster manager (including the remote network metrics). That is, in one embodiment of the invention, the remote cluster may not parse out the remote network metrics (i.e., its own 'local network metrics') to send to the requesting cluster manager. Accordingly, upon receipt of the network metrics data structure maintained by the remote cluster, the cluster manager may parse and store only the remote network metrics directly measured by the remote cluster.

Alternatively, in one or more embodiments of the invention, the cluster manager may store all, or a portion, of the network metrics received from the remote cluster based on one or more criteria. For example, in one embodiment of the invention where each network metric is timestamped, the cluster manager may save only the networks metrics that are newer than the network metrics currently maintained by the cluster manager.

In Step 914, the cluster manager determines if any remaining clusters have not yet been analyzed and/or are associated with outdated network metrics. In one or more embodiments of the invention, the cluster manager may determine that certain data associated with a cluster (e.g., local network metrics and/or the remote network metrics of that cluster) are outdated based on a time threshold (compared with a timestamp associated with the network metric) and therefore need to be updated. If the cluster manager determines that one or more additional clusters need to be analyzed and/or updated (914-YES), the process returns back to Step 900. Alternatively, if the cluster manager determines that no additional clusters need to be analyzed (914-NO), the process ends.

Figure 10:
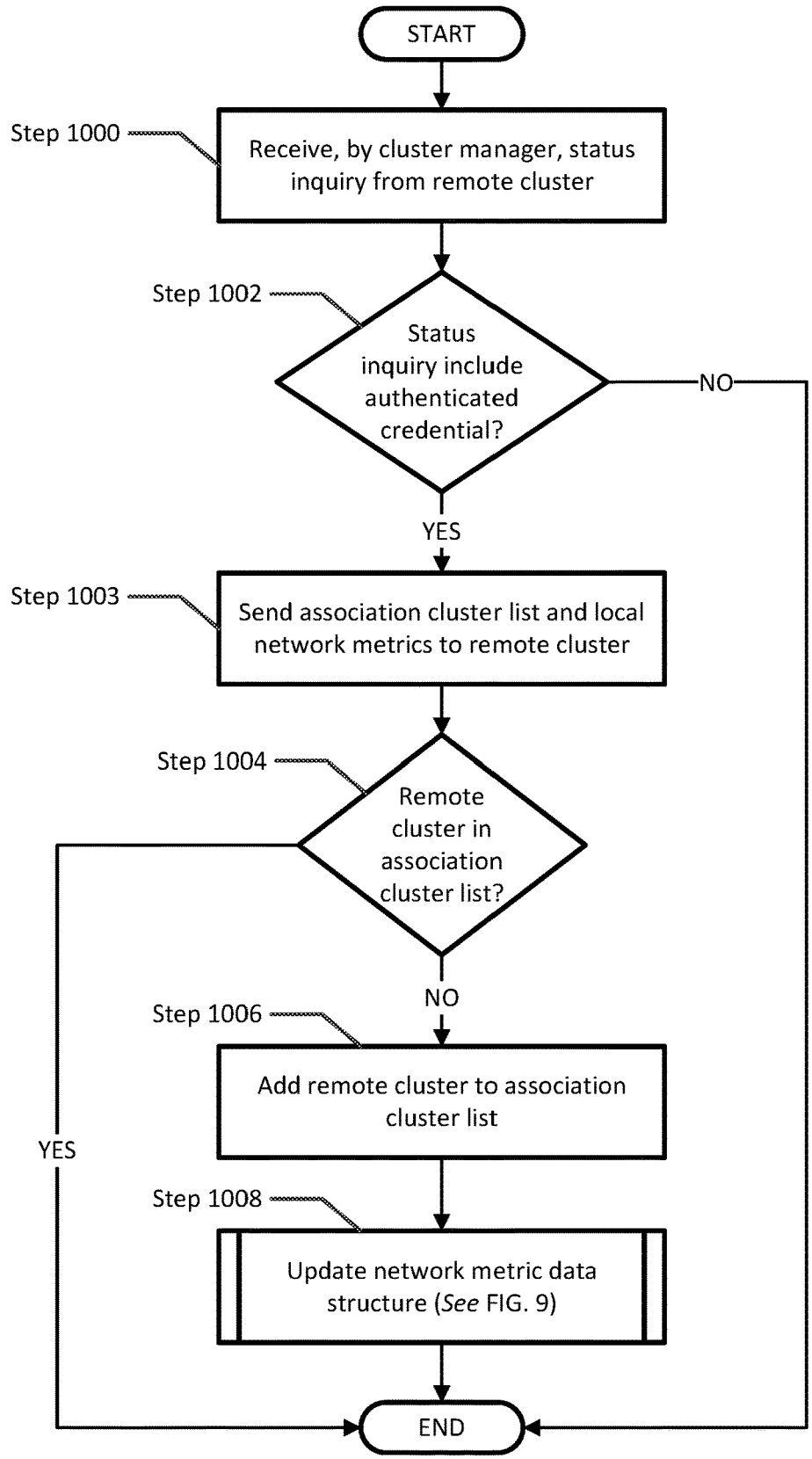
FIG. 10 shows a flowchart of a method of receiving a status inquiry from a remote cluster, in accordance with one or more embodiments of the invention.

FIG. 10 shows a flowchart of a method of receiving a status inquiry from a remote cluster, in accordance with one or more embodiments of the invention. All or a portion of the method shown in FIG. 10 may be performed by one or more components of the cluster manager. Another component of the system may perform this method without departing from the invention. While the various steps in this flowchart are presented and described sequentially, one of ordinary skill in the relevant art will appreciate that some or all of the steps may be executed in different orders, may be combined or omitted, and some or all steps may be executed in parallel.

In Step 1000, a cluster manager receives a status inquiry from a remote cluster. In one or more embodiments of the invention, cluster managers (of each cluster) regularly sends status inquires to other clusters to update their network metrics data structure and/or association cluster list. In one embodiment of the invention, as discussed in the description of Step 902, the status inquiry may include (i) an authenticated credential, (ii) requests for the locally maintained association cluster list and network metrics data structure, and (iii) network diagnostic data to measure metrics of the network connection operatively connecting the two clusters.

In Step 1002, the cluster manager determines if the status inquiry (received in Step 1000) includes a valid authenticated credential. In one or more embodiments of the invention, each cluster manager of the association is configured to only respond to requests and/or messages from other clusters if those requests and/or messages are properly authenticated (e.g., includes a valid authenticated credential). Thus, prior to analyzing the status inquiry, the cluster manager verifies that the message is properly authenticated (by the cluster manager that sent the request).

In one or more embodiments of the invention, the cluster manager authenticates the status inquiry by verifying that the authenticated credential, included therein, is valid. In one embodiment of the invention, the cluster manager verifies the authenticated certificate by querying the association manager to determine if the authenticated credential (i.e., a signed certificate signed by the association manager) validly belongs to the remote cluster manager from which it was sent.

If status inquiry does not include a valid authenticated credential and/or is otherwise not authenticated (1002-NO), the process ends. Alternatively, if status inquiry does include a valid authenticated credential and is properly authenticated (1002-YES), the process proceeds to Step 1003.

In Step 1003, the cluster manager sends a copy of the association cluster list and local network metrics to the remote cluster. In one or more embodiments of the invention, the status inquiry also includes a request for network metrics and the association cluster list of maintained by the cluster manager. Thus, in one embodiment of the invention, after the status inquiry is authenticated, the cluster manager generates a message that includes the locally maintained association cluster list and network metrics data structure. Alternatively, if the status inquiry did not request a copy of the association cluster list and/or network metrics, the process may provide only the requested information.

In Step 1004, the cluster manager determines if the remote cluster, from which the status inquiry was received, is listed in the locally maintained association cluster list. In one embodiment of the invention, the cluster manager determines if the cluster is in the association cluster list by performing a lookup, in the association cluster list, and attempting to match the remote cluster identifier and/or remote cluster address with each cluster list entry in the association cluster list.

In one or more embodiments of the invention, a cluster that recently joined the association may not yet have had contact with every other cluster. Thus, the association cluster list maintained by the cluster manager may be incomplete if one or more other clusters recently joined the association and/or the cluster to which the cluster manager belongs recently joined the association.

If the status inquiry was received from a remote cluster that already exists in the association cluster list maintained by the cluster manager (1004-YES), the process ends. Alternatively, if the status inquiry was received from a remote cluster that is not listed in that in the association cluster list maintained by the cluster manager (1004-NO), the process proceeds to Step 1006.

In Step 1006, the cluster manager creates a new cluster list entry, for the remote cluster, in the association cluster list. In one or more embodiments of the invention, the cluster manager identifies the cluster address from the status inquiry and stores that information in the newly created cluster list entry associated with the remote cluster. Further, in one embodiment of the invention, the cluster manager may further create a new cluster metrics entry, in the network metrics data structure, associated with the newly identified remote cluster and further store known information therein.

In Step 1008, the cluster manager updates the network metrics data structure. In one or more embodiments of the invention, when a new cluster is added to the association cluster list, the cluster manager lacks any network metrics associated with that new cluster. Accordingly, the cluster manager may update the network metrics data structure by performing the process as discussed in the description of FIG. 9. Further, assuming, for example, that the network metrics data structure is otherwise up-to-date, the cluster manager only updates the network metrics data structure with respect to the newly identified remote cluster.

Figure 11:
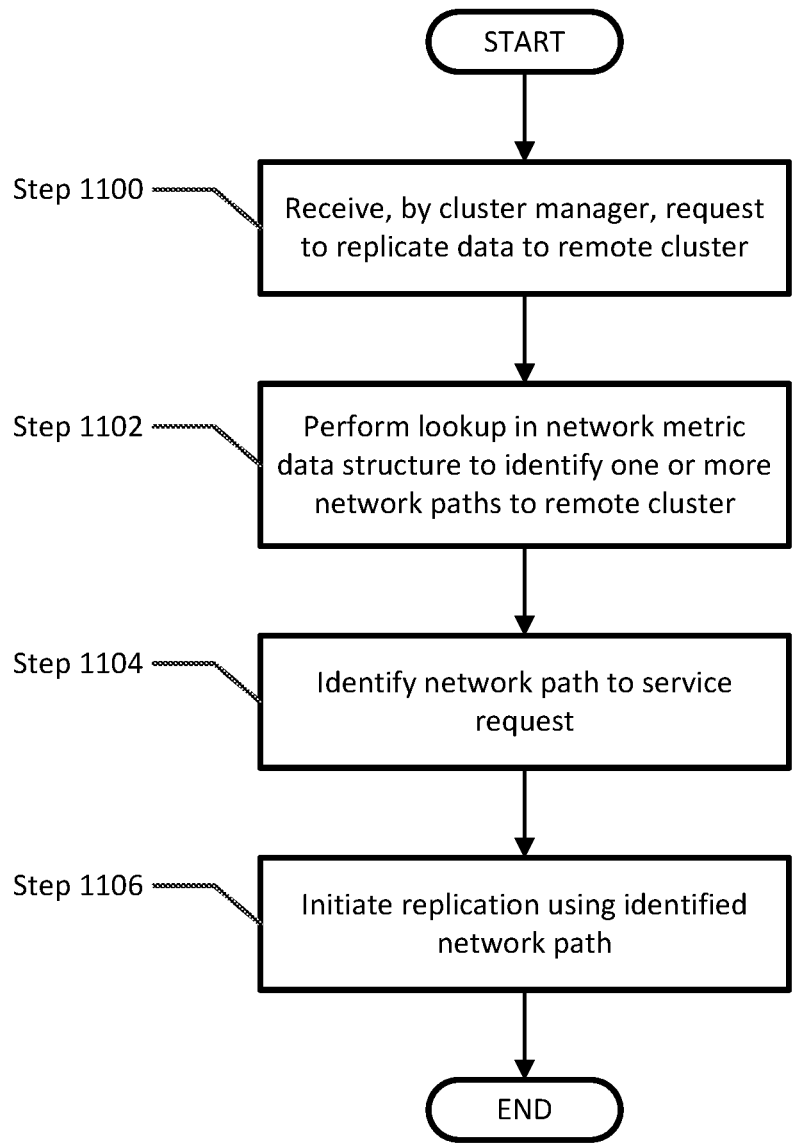
FIG. 11 shows a flowchart of a method of servicing a replication request, in accordance with one or more embodiments of the invention.

FIG. 11 shows a flowchart of a method of servicing a request to replicate data, in accordance with one or more embodiments of the invention. All or a portion of the method shown in FIG. 11 may be performed by one or more components of the cluster manager. Another component of the system may perform this method without departing from the invention. While the various steps in this flowchart are presented and described sequentially, one of ordinary skill in the relevant art will appreciate that some or all of the steps may be executed in different orders, may be combined or omitted, and some or all steps may be executed in parallel.

In Step 1100, a cluster manager receives a request to replicate data to a remote cluster. In one or more embodiments of the invention, a request to replicate data may specify the remote cluster (e.g., via a cluster identifier and/or cluster address) and the data to be replicated (e.g., via some identifier associated with data stored within the cluster).

Alternatively, in one or more embodiments of the invention, the request may not specify the exact cluster to copy the data to, but may instead specify several clusters, any of which would satisfy the data replication request. Or, alternatively, the data replication request may specify some property of a cluster, which may be applicable to one or more clusters, any of which copying the data onto would satisfy the request.

In one or more embodiments of the invention, the data replication request is automatically generated by the cluster manager (or a node of the cluster) based on some metric associated with the data. For example, if a static, read-only file, located on a node within a cluster is repeatedly being accessed by thousands of simultaneous clients (i.e., a popular online video), across a large geographic area (e.g., the United States), a request to replicate the data to another cluster may be initiated. Continuing with the example, if a single copy of the video file is located on a cluster located on the east coast of the United States, the request to initiate data may specify that the video should be copied to any cluster located on the west coast of the United States.

Alternatively, in one or more embodiments of the invention, data may already exist on multiple clusters, each of which may be simultaneously servicing that data. In the event that one of those clusters fails (and/or otherwise goes offline), one or more other clusters may generate a data replication request to copy the data to one or more other clusters based on the reduced servicing capacity realized by the failure of one of the hosting clusters.

In Step 1102, the cluster manager performs a lookup in the network metrics data structure to identify one or more network paths to the remote cluster (specified in the request received in Step 1100). In one or more embodiments of the invention, the cluster manager identifies all possible paths from the local cluster to one or more cluster(s) that satisfies the data replication request.

In Step 1104, the cluster manager identifies a single network path, of the network paths identified in Step 1102, to service the data replication request. In one embodiment of the invention, the cluster manager identifies a single network path by comparing each of the one or more network paths (identified at Step 1102) and selecting one network path based on one more criteria. In one embodiment of the invention, a cluster manager identifies a single network path to a remote cluster (matching the data replication request) by optimizing a single network metric (e.g., RTT, latency, bandwidth, etc.). Alternatively, in one embodiment of the invention, two or more network metrics may be assigned different weights, which are then combined such that a single quantitative score for each network path may be compared. The cluster manager may compare two or more network paths by performing an analysis of the desired metrics, for each network path, to determine which network path is most suited to service the data replication request.

For example, in one embodiment of the invention, if transfer speed and reliability of the network path are both equally important metrics, the cluster manager may use throughput and reliability as equally important factors when determining which network path to pick (assigning each an equal weight). Alternatively, if it is deemed critical that the as much data be moved as quickly as possible, even at the expensive of data loss, the speed of the path may be considered the single most important factor (assigned a highest rank), even if packet loss is abnormally high. This way, in one embodiment of the invention, large portions of the data are able to be quickly moved to a new host and served to clients, while any losses can be corrected at a later time.

As another example, if data redundancy is chosen to be an important factor (assigned a high weight), the cluster manager may choose a network path that includes multiple other clusters, onto which the data may additionally be replicated en route to the identified cluster. Continuing with the example above, if the video being streamed by thousands of simultaneous viewers suddenly spikes to millions of simultaneous viewers, it may be decided that the data needs to be copied to every cluster that can provide low latency access to large population centers. Thus, instead of merely replicating the data from a cluster located in New York directly to a cluster located in Los Angeles, the cluster manager determines that a network path traversing clusters in Philadelphia, Chicago, and Houston should be traversed (along the way to the Los Angeles cluster) so that the data may be replicated to those intermediary clusters as well. Further, by copying the data to several other clusters, the cluster managers (of those other clusters) are similarly able to initiate replication of the data to one or more other clusters, concurrently, thereby providing rapid distribution of the highly demanded data. Thus, while data may not be replicated via the fastest possible route, a network path is chosen that, nonetheless, reduces access to a single overburden cluster (e.g., the cluster in New York) by providing multiple other sources for the data to be served from (e.g., clusters in Philadelphia, Chicago, and Houston) instead of only replicating the data to one other cluster (e.g., in Los Angeles).

One of ordinary skill in the art, having the benefit of this detailed description, would appreciate that one or more metrics may be used when determining the network path to replicate data.

In Step 1106, the cluster manager initiates replication of the data (e.g., "data replication process", "data copy operation") using the identified network path. In one or more embodiments of the invention, the cluster manager may generate and send instructions to one or more nodes of the cluster to begin copying data to the remote cluster specified in the replication request. Further, in one embodiment of the invention, where the replication path requires copying the data to more than one cluster, the cluster manager provides the node with instructions to ensure that the data is copied using the network path identified in Step 1104.

Further, in one or more embodiments of the invention, as the path to copy data from one cluster to another may traverse other clusters, the cluster manager that originally initiated the data replication may not have the ability to directly control the data replication process after the data is copied to the first cluster. Thus, in one embodiment of the invention, the cluster manager that initiates the data replication process further instructs the next cluster (or each cluster along the network path) to continue initiating the data replication process. For example, in the circumstance where the New York cluster copies data to the Philadelphia cluster, the New York cluster may further instruct the Philadelphia cluster to copy the data to the Chicago cluster. The New York cluster may then instruct the Chicago cluster to copy the data to the Houston cluster, before finally instructing the Houston cluster to copy the data to the Los Angeles cluster (thereby satisfying the initial data replication request). Alternatively, each cluster (New York, Philadelphia, Chicago, and Houston) may individually initiate their own portion of the data replication process to ensure the initial data replication request (received in New York) is serviced.

Figure 12:
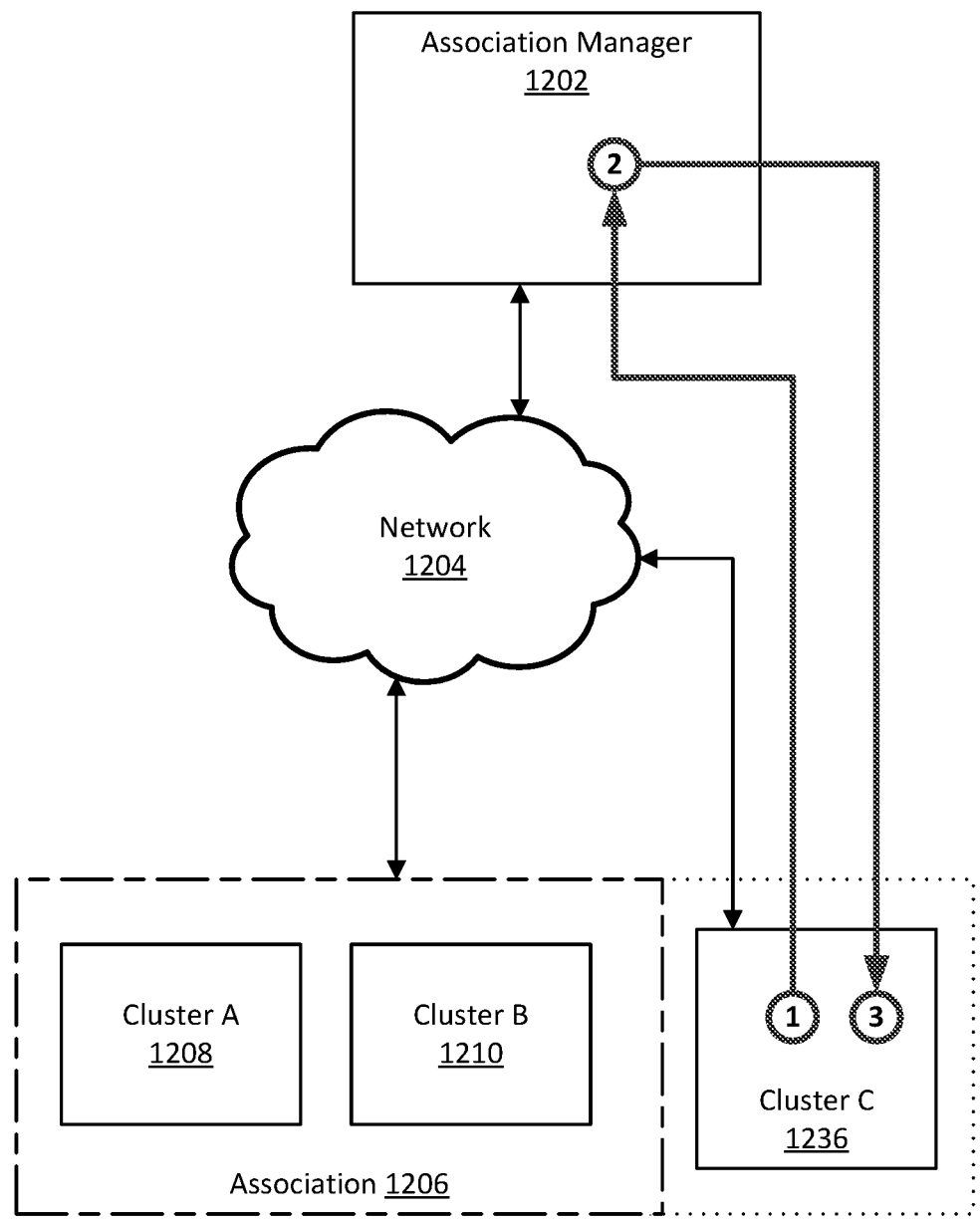
FIG. 12 shows an example, in accordance with one or more embodiments of the invention.

FIG. 12 shows an example, in accordance with one or more embodiments of the invention. The following use case is for explanatory purposes only and not intended to limit the scope to this embodiment.

In FIG. 12, consider a scenario in which, an association manager (1202) manages association (1206) via network (1204). In its current state, the association (1206) includes cluster A (1208) and cluster B (1210). However, cluster C (1236) is not, in the beginning, a member of association (1206).

At (1), a cluster manager (not shown) of cluster C (1236) receives a command to join an association. In response to the command, cluster manager C generates an association access request that includes an association access credential (stored within cluster manager C). Cluster manager C then sends the association access request to association manager (1202) using a known address of the association manager (e.g., as soc12.example.com).

At (2), association manager (1202) receives the association access request and determines if the request is valid. Specifically, association manager (1202) analyzes the association access request and determines that the association access credential therein matches a known association access credential associated with cluster C (1236). Accordingly, in response, the association manager (1202) generates an authenticated credential unique to cluster C (1236) and send the authenticated credential and an association cluster list back to cluster C (1236) (e.g., association information).

At (3), cluster C (1236) (and/or cluster manager C thereof) receives the authenticated credential and association cluster list from association manager (1202). Once obtained, cluster C is then able to communicate (e.g., send and receive messages and data) with other clusters (1208, 1210) in the association (1206) using the authenticated credential. Thus, cluster C (1236) is then considered to be a member of the association (1206).

Figure 13:
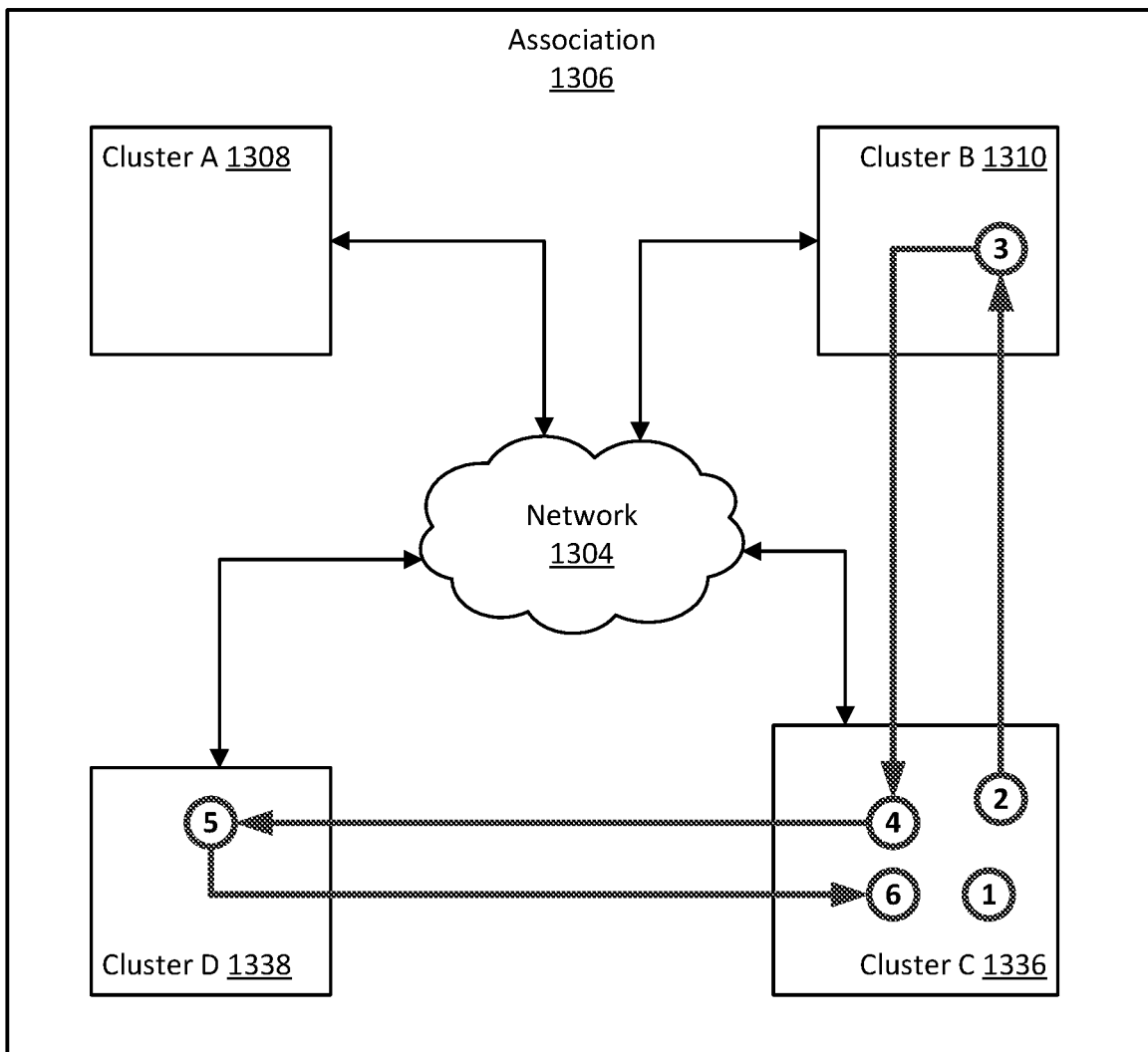
FIG. 13 shows an example, in accordance with one or more embodiments of the invention.

FIG. 13 shows an example, in accordance with one or more embodiments of the invention. The following use case is for explanatory purposes only and not intended to limit the scope to this embodiment.

In FIG. 13, consider a scenario in which, association (1306) includes cluster A (1308), cluster B (1310), cluster C (1336), and cluster D (1338) all operatively connected via network (1304); where at (1), cluster manager C (not shown) of cluster C (1336) performs a lookup in a locally maintained association cluster list. From that lookup, cluster manager C identifies cluster B (1310) (via its cluster identifier in the association cluster list) as another cluster within association (1306).

Accordingly, at (2), cluster manager C generates a status inquiry that includes (i) an authenticated credential specific to cluster C (1336) for association (1306), (ii) a ping message to determine local network metrics about the network connection between cluster C (1336) and cluster B (1310), and (iii) a request for the remote network metrics and association cluster list maintained by cluster B (1310). Cluster manager C then transmits that status inquiry to cluster B (1310) using the cluster address included in the cluster list entry associated with cluster B (1310).

At (3), cluster B (1310) (and/or cluster manager B (not shown) thereof) receives the inquiry request from cluster C (1336). Cluster B (1310) authenticates the status inquiry by determining that the status inquiry properly includes a valid authenticated credential, specific to cluster C (1336) associated with the association (1306). After the status inquiry is authenticated, cluster manager B reads the inquiry request and, in response to the request for data, generates and sends the locally maintained association cluster list and network metrics data structure to cluster C (1336).

At (4), cluster C (1336) (and/or cluster manager C (not shown) thereof) receives the association cluster list and network metrics data structure maintained by cluster manager B. Cluster manager C updates the network metrics data structure to include the local network metrics directly measured from the inquiry request in addition to any remote network metrics received from cluster manager B regarding the network connections between other clusters (e.g., not cluster C (1336)).

Further, cluster manager C updates the locally maintained association cluster list to additionally include each cluster identified in the association cluster list received from cluster manager B (that is not already identified in the locally maintained association cluster list). Specifically, from the received association cluster list, cluster manager C identifies cluster D (1338) as a previously unknown cluster. Accordingly, cluster manager C creates a new cluster list entry (in the association cluster list) and a new cluster metrics entry (in the network metrics data structure), specific to Cluster D (1338).

Accordingly, in response to the identification of a new cluster (cluster D (1338)), cluster manager C generates a status inquiry that includes (i) an authenticated credential specific to cluster C (1336) for association (1306), (ii) a ping message to determine local network metrics about the network connection between cluster C (1336) and cluster D (1338), and (iii) a request for the remote network metrics and association cluster list maintained by cluster D (1338). Cluster manager C then transmits that status inquiry to cluster D (1338) using the cluster address included in the cluster list entry associated with cluster D (1338) (as received by the association cluster list maintained by cluster manager B).

At (5), cluster D (1338) (and/or cluster manager D (not shown) thereof) receives the inquiry request from cluster C (1336). Cluster D (1338) authenticates the status inquiry by determining that the status inquiry properly includes an authenticated credential, specific to cluster C (1336) associated with the association (1306). After the status inquiry is authenticated, cluster manager D reads the inquiry request and, in response to the request for data, generates and sends the locally maintained association cluster list and network metrics data structure to cluster D (1338).

At (6), like at (4), cluster manager C updates the locally maintained network metrics data structure and association cluster list to include the information provided by Cluster D (1338). Further, although not shown, Cluster A (1308), Cluster B (1310), and Cluster D (1338) may perform similar functions with respect to Cluster C (1336) (and among each other) upon the discovery of a previously unknown cluster within association (1306).

Figure 14:
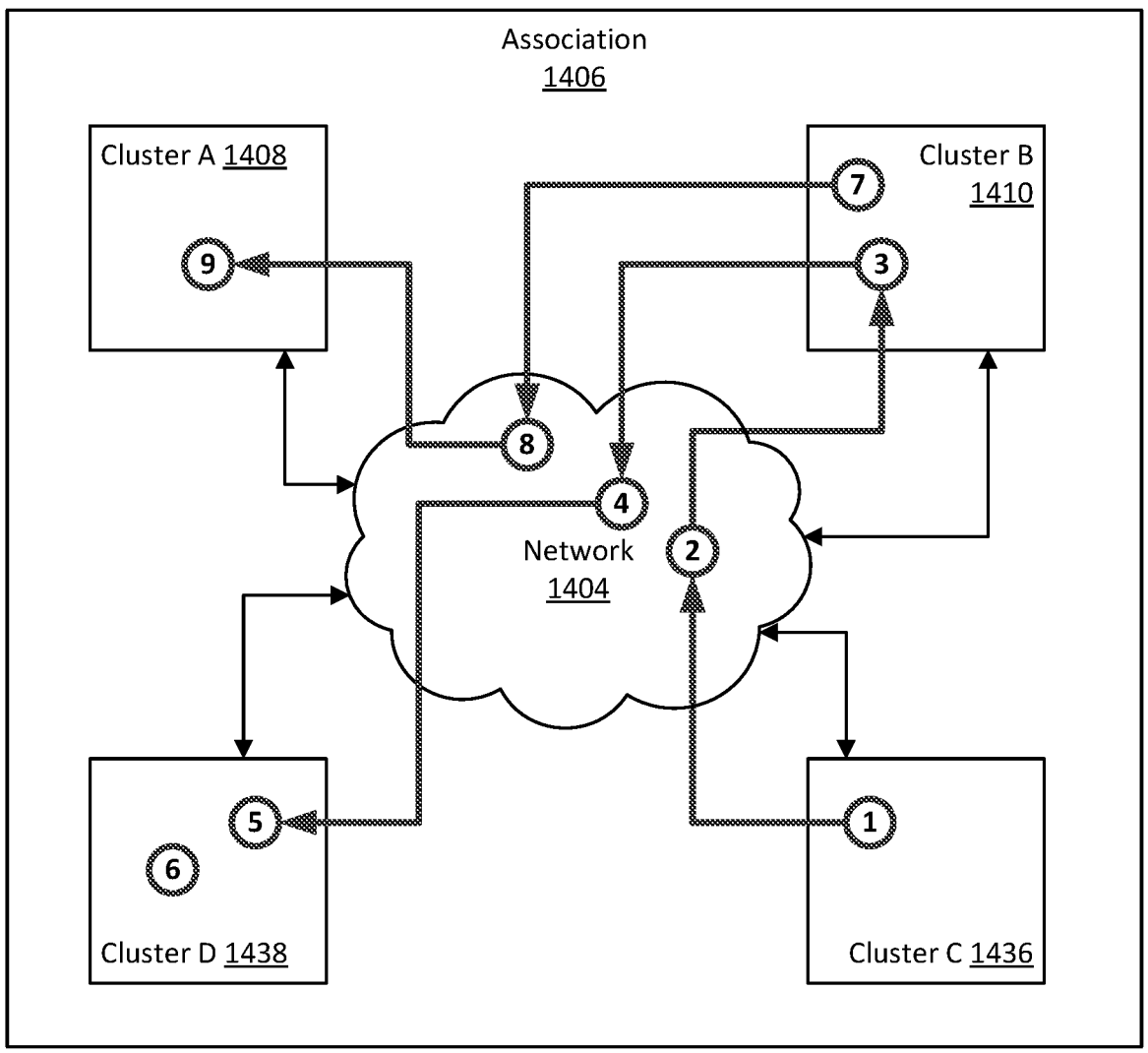
FIG. 14 shows an example, in accordance with one or more embodiments of the invention.

FIG. 14 shows an example, in accordance with one or more embodiments of the invention. The following use case is for explanatory purposes only and not intended to limit the scope to this embodiment.

In FIG. 14, consider a scenario in which, association (1406) includes cluster A (1408), cluster B (1410), cluster C (1436), and cluster D (1438) each of which is operatively connected via network (1404).

At (1), cluster manager C (not shown) of cluster C (1436) receives a data replication request that specifies two conditions. First, the data replication request specifies that the data must be replicated from cluster C (1436) to cluster D (1438); and second, the data replication request specifies that the data must be copied to at least one other cluster (of association (1406)) in addition to cluster D (1438).

Cluster manager C performs a lookup in its locally maintained network metrics data structure and identifies every network path from cluster C (1436) to cluster D (1438). First, cluster manager C determines that the network path from cluster C (1436) to cluster D (1438) is very slow and that indirect network paths to cluster D (1438), traversing other clusters, are much faster. Thus, while it would be possible to service the data replication request by copying data directly from cluster C (1436) to cluster D (1438), then copying the same data from cluster C (1436) to either cluster B (1410) or cluster A (1408), it is determined that it would faster and less costly to first copy the data to another cluster (1408, 1410) before having that other cluster copy that same data to cluster D (1438).

Thus, cluster manager C determines that, of the two paths that traverse other clusters (cluster B (1410) and cluster A (1408)), the route with the lowest latency is the network path that traverses cluster B (1410) as an intermediary device. Thus, cluster manager C determines that the network path to satisfy the data replication request is a network path from cluster C (1436) to cluster B (1410) to cluster D (1438). Cluster manager C then initiates the data replication process (e.g., "data copy operation").

At (2), the data is transmitted to cluster B (1410) via a network connection between cluster C (1436) and cluster B (1410). Further, once copied to cluster B (1410), cluster manager C sends a command to cluster B (1410) to initiate the remainder of the data replication process. At (3), the data is received by cluster B (1410) along with a data replication request to copy the data to cluster D (1438). Thus, cluster manager B (not shown) of cluster B (1410) initiates a data replication process to copy the data from cluster B (1410) to cluster D (1438). At (4), the data is transmitted to cluster D (1438) via a network connection between cluster B (1410) and cluster D (1438) through network (1404). At (5), the data is received by cluster D (1438) and stored on a node therein.

At (6), cluster D (1438) fails and is disconnected from all operative connections. At (7), cluster manager B generates a data replication request based on the reduced servicing capacity caused by the failure of cluster D (1438). Specifically, cluster manager B determines that the data (copied to cluster D (1438) at (5)) needs to be copied to cluster A (1408) and initiates the data replication process. At (8), the data is copied from cluster B (1410) to cluster A (1408) via a network connection through network (1404). At (9), the data is received by cluster A (1408) and stored on a node therein.

One or more embodiments of the invention make it possible for a cluster to seamlessly join an association using preconfigured credentials and a known address of an association manager. Thus, in one embodiment of the invention, limited user configuration is required when commanding a cluster join an association, thereby minimizing the potential for user error. Further, once established as a member in an association, a cluster manager (of a newly joined cluster) is able to identify other (remote) clusters within the association by continually and automatically sharing information about known members in that association with other clusters. Further, one or more embodiments of the invention make it possible for a cluster manager to obtain, maintain, and analyze network paths within the association to determine which network path(s) are best to service data replication requests.

While one or more embodiments have been described herein with respect to a limited number of embodiments and examples, one of ordinary skill in the art, having the benefit of this detailed description, would appreciate that other embodiments can be devised which do not depart from the scope of the embodiments disclosed herein. Accordingly, the scope should be limited only by the attached claims.

What is claimed is:

1. A method for joining an association, comprising:
  receiving, by a first cluster, an association access credential and a unique address of an association manager;
  generating, based on the association access credential, an association access request;
  sending, to the unique address, the association access request;
  receiving, in response to the sending, association information comprising: a first authenticated credential and a first association cluster list that indicates the second cluster; and
  initiating, based on the association information, a connection to a second cluster in the association, wherein initiating the connection comprises:
    performing a first lookup in the first association cluster list;
    identifying, based on the first lookup, the second cluster and a second cluster address; and
    sending, to the second cluster address, a first inquiry request that comprises the first authenticated credential;
  after initiating the connection:
    receiving, from the second cluster, a second association cluster list that indicates a third cluster in the association; and
    generating, based on the first association cluster list and the second association cluster list, an updated association cluster list;
  after generating the updated association cluster list:
    performing a second lookup in the updated association cluster list;
    identifying, based on the second lookup, the third cluster and a third cluster address; and
    sending, to the third cluster address, a second inquiry request.

2. The method of claim 1, wherein the method further comprises:
  after initiating the connection:
    receiving, from the second cluster, an inquiry request;
    making a determination that the inquiry request comprises a second authenticated credential; and
    sending, based on the determination, the first association cluster list to the second cluster.

3. The method of claim 1, wherein the association information is generated by the association manager.

4. The method of claim 3, wherein generating the association information, by the association manager, comprises:
  receiving, from the first cluster, the association access request;
  making a determination that the association access request is valid;
  generating, based on the determination, the first authenticated credential; and
  sending, to the first cluster, the association information.

5. The method of claim 1, wherein generating the updated association cluster list comprises:
  making a determination that the third cluster is not indicated in the first association cluster list; and
  adding, based on the determination, an indication of the third cluster and a third cluster address to the first association cluster list.

6. A non-transitory computer readable medium comprising instructions which, when executed by a computer processor, configuring the computer processor to perform a method for joining an association, the method comprising:
  receiving, by a first cluster, an association access credential and a unique address of an association manager;
  generating, based on the association access credential, an association access request;
  sending, to the unique address, the association access request;
  receiving, in response to the sending, association information comprising: a first authenticated credential and a first association cluster list that indicates the second cluster; and
  initiating, based on the association information, a connection to a second cluster in the association, wherein initiating the connection comprises:
    performing a first lookup in the first association cluster list;
    identifying, based on the first lookup, the second cluster and a second cluster address; and
    sending, to the second cluster address, a first inquiry request that comprises the first authenticated credential;
  after initiating the connection:
    receiving, from the second cluster, a second association cluster list that indicates a third cluster in the association; and
    generating, based on the first association cluster list and the second association cluster list, an updated association cluster list;
  after generating the updated association cluster list:
    performing a second lookup in the updated association cluster list;
    identifying, based on the second lookup, the third cluster and a third cluster address; and
    sending, to the third cluster address, a second inquiry request.

7. The non-transitory computer readable medium of claim 6, wherein the method further comprises:
  after initiating the connection:
    receiving, from the second cluster, an inquiry request;
    making a determination that the inquiry request comprises a second authenticated credential; and
    sending, based on the determination, the first association cluster list to the second cluster.

8. The non-transitory computer readable medium of claim 6, wherein the association information is generated by the association manager.

9. The non-transitory computer readable medium of claim 8, wherein generating the association information, by the association manager, comprises:
  receiving, from the first cluster, the association access request;
  making a determination that the association access request is valid;
  generating, based on the determination, the first authenticated credential; and
  sending, to the first cluster, the association information.

10. A first cluster, comprising:
memory;
persistent storage; and
a processor, wherein the processor is configured to:
- receive, by the first cluster, an association access credential and a unique address of an association manager;
- generate, based on the association access credential, an association access request;
- send, to the unique address, the association access request;
- receive, in response to the sending, association information comprising: a first authenticated credential and a first association cluster list that indicates the second cluster; and
- initiate, based on the association information, a connection to a second cluster in the association, wherein initiating the connection comprises:
  - performing a first lookup in the first association cluster list;
  - identifying, based on the first lookup, the second cluster and a second cluster address; and
  - sending, to the second cluster address, a first inquiry request that comprises the first authenticated credential;
after initiating the connection:
- receive, from the second cluster, a second association cluster list that indicates a third cluster in the association; and
- generate, based on the first association cluster list and the second association cluster list, an updated association cluster list;
after generating the updated association cluster list:
- perform a second lookup in the updated association cluster list;
- identify, based on the second lookup, the third cluster and a third cluster address; and
- send, to the third cluster address, a second inquiry request.

11. The first cluster of claim 10, wherein the processor is further configured to:
after initiating the connection:
- receive, from the second cluster, an inquiry request;
- make a determination that the inquiry request comprises a second authenticated credential; and
- send, based on the determination, the first association cluster list to the second cluster.

12. The first cluster of claim 10, wherein the association information is generated by the association manager.

13. The first cluster of claim 12, wherein generating the association information, by the association manager, comprises:
- receiving, from the first cluster, the association access request;
- making a determination that the association access request is valid;
- generating, based on the determination, the first authenticated credential; and
- sending, to the first cluster, the association information.

* * * * *